United States Patent
Benoit et al.

(10) Patent No.: US 10,282,224 B2
(45) Date of Patent: May 7, 2019

(54) DYNAMIC REGISTER VIRTUALIZATION

(71) Applicant: QUALCOMM Incorporated, San Diego, CA (US)

(72) Inventors: Olivier Jean Benoit, San Diego, CA (US); Rosario Cammarota, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 103 days.

(21) Appl. No.: 14/861,637

(22) Filed: Sep. 22, 2015

(65) Prior Publication Data

US 2017/0083355 A1    Mar. 23, 2017

(51) Int. Cl.
| | |
|---|---|
| *G06F 9/455* | (2018.01) |
| *G06F 9/54* | (2006.01) |
| *G06F 9/30* | (2018.01) |
| *G06F 9/38* | (2018.01) |

(52) U.S. Cl.
CPC ...... *G06F 9/45558* (2013.01); *G06F 9/30098* (2013.01); *G06F 9/30123* (2013.01); *G06F 9/384* (2013.01); *G06F 9/547* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,127,592 | B2 * | 10/2006 | Abraham | G06F 9/30127 712/217 |
| 8,769,373 | B2 | 7/2014 | Rogers, Jr. et al. | |
| 8,839,429 | B2 | 9/2014 | Komaromy et al. | |
| 2003/0154363 | A1 | 8/2003 | Soltis et al. | |
| 2004/0133766 | A1 | 7/2004 | Abraham et al. | |
| 2004/0162920 | A1 * | 8/2004 | Topham | G06F 8/4452 710/5 |
| 2007/0239804 | A1 * | 10/2007 | Armstrong | G06F 11/1438 |
| 2008/0109614 | A1 * | 5/2008 | Begon | G06F 9/384 711/154 |
| 2011/0197256 | A1 * | 8/2011 | Sharkey | G06F 21/53 726/1 |

(Continued)

FOREIGN PATENT DOCUMENTS

| | | | | |
|---|---|---|---|---|
| WO | WO 02054228 A1 * | 7/2002 | | G06F 9/3836 |
| WO | 2012078735 A2 | 6/2012 | | |

OTHER PUBLICATIONS

International Search Report and Written Opinion—PCT/US2016/047846—ISA/EPO—dated Nov. 17, 2016.

(Continued)

*Primary Examiner* — Umut Onat
(74) *Attorney, Agent, or Firm* — Hunter Clark PLLC (57) ABSTRACT

A method, apparatus, and system for utilizing a register virtualization mapping to improve defense against return-oriented programming-based attacks is disclosed. A register virtualization mapping, which is bijection between nominal registers and physical registers, is generated for a subroutine call when the subroutine call is detected. The register virtualization mapping is applied to instructions within the subroutine call. The register virtualization mapping is stopped for the subroutine call at the return of the subroutine call.

26 Claims, 4 Drawing Sheets

(56) References Cited

U.S. PATENT DOCUMENTS

| | | |
|---|---|---|
| 2012/0151182 A1* | 6/2012 | Madajczak ............. G06F 9/384 |
| | | 712/5 |
| 2013/0145130 A1 | 6/2013 | Brelot et al. |
| 2014/0283040 A1 | 9/2014 | Wilkerson et al. |
| 2015/0199507 A1 | 7/2015 | Azab et al. |
| 2015/0213264 A1 | 7/2015 | Mooring et al. |

OTHER PUBLICATIONS

Lu Y., et al.,"Lightweight DPA Resistant Solution on FPGA to Counteract Power Models," Field-Programmable Technology (FPT), 2010 International Conference on, IEEE, Piscataway, NJ, USA, Dec. 8, 2010 (Dec. 8, 2010), pp. 178-183, XP031844701, ISBN: 978-1-4244-8980-0.

May D., et al.,"Random Register Renaming to Foil DPA," Cryptographic Hardware and Embedded Systems, 3rd International Workshop, CHES 2001, Paris, Francce, May 14-16, 2001 Proceedings; [Lecture Notes in Computer Science], Berlin : Springer, De, vol. 2162, May 14, 2001 (May 14, 2001), pp. 28-38, XP001061158, ISBN: 978-3-540-42521-2.

\* cited by examiner

DYNAMIC REGISTER VIRTUALIZATION

FIELD

The subject matter disclosed herein relates to electronic devices, and more particularly to methods, apparatuses, and systems for defending against malicious attacks on computer systems.

BACKGROUNDS

Return-oriented programming (ROP) is a computer security exploit technique by which an attacker can induce arbitrary behavior in a program whose control flow the attacker has diverted without injecting any code. An ROP program chains together short instruction sequences, or "gadgets," that are already present in a program's address space. Each of the gadgets typically ends in a return instruction.

ROP is a state-of-the-art security exploit technique that can be used to defeat security defenses such as non-executable memory or code signing. Known defenses against ROP, such as Control Flow Integrity (CFI) or code diversity, have certain drawbacks. For example, they may require changes in the toolchain (i.e., a set of software development tools), or may require hardware changes that may introduce significant overhead.

SUMMARY

One aspect of the disclosure is related to a method for dynamic register virtualization implemented within a processor, comprising: detecting a subroutine call; generating a register virtualization mapping for the subroutine call; applying the register virtualization mapping to instructions within the subroutine call; detecting a return of the subroutine call; and stopping the register virtualization mapping for the subroutine call at the return of the subroutine call.

Another aspect of the disclosure is related to an apparatus comprising: a memory; and a processor coupled to the memory, the processor to: detect a subroutine call, generate a register virtualization mapping for the subroutine call, apply the register virtualization mapping to instructions within the subroutine call, detect a return of the subroutine call, and stop the register virtualization mapping for the subroutine call at the return of the subroutine call.

A further aspect of the disclosure is related to an apparatus comprising: means for detecting a subroutine call; means for generating a register virtualization mapping for the subroutine call; means for applying the register virtualization mapping to instructions within the subroutine call; means for detecting a return of the subroutine call; and means for stopping the register virtualization mapping for the subroutine call at the return of the subroutine call.

Yet another aspect of the disclosure is related to a non-transitory computer-readable medium including code which, when executed by a processor, causes the processor to perform a method comprising: detecting a subroutine call; generating a register virtualization mapping for the subroutine call; applying the register virtualization mapping to instructions within the subroutine call; detecting a return of the subroutine call; and stopping the register virtualization mapping for the subroutine call at the return of the subroutine call.

DETAILED DESCRIPTION

Figure 1:
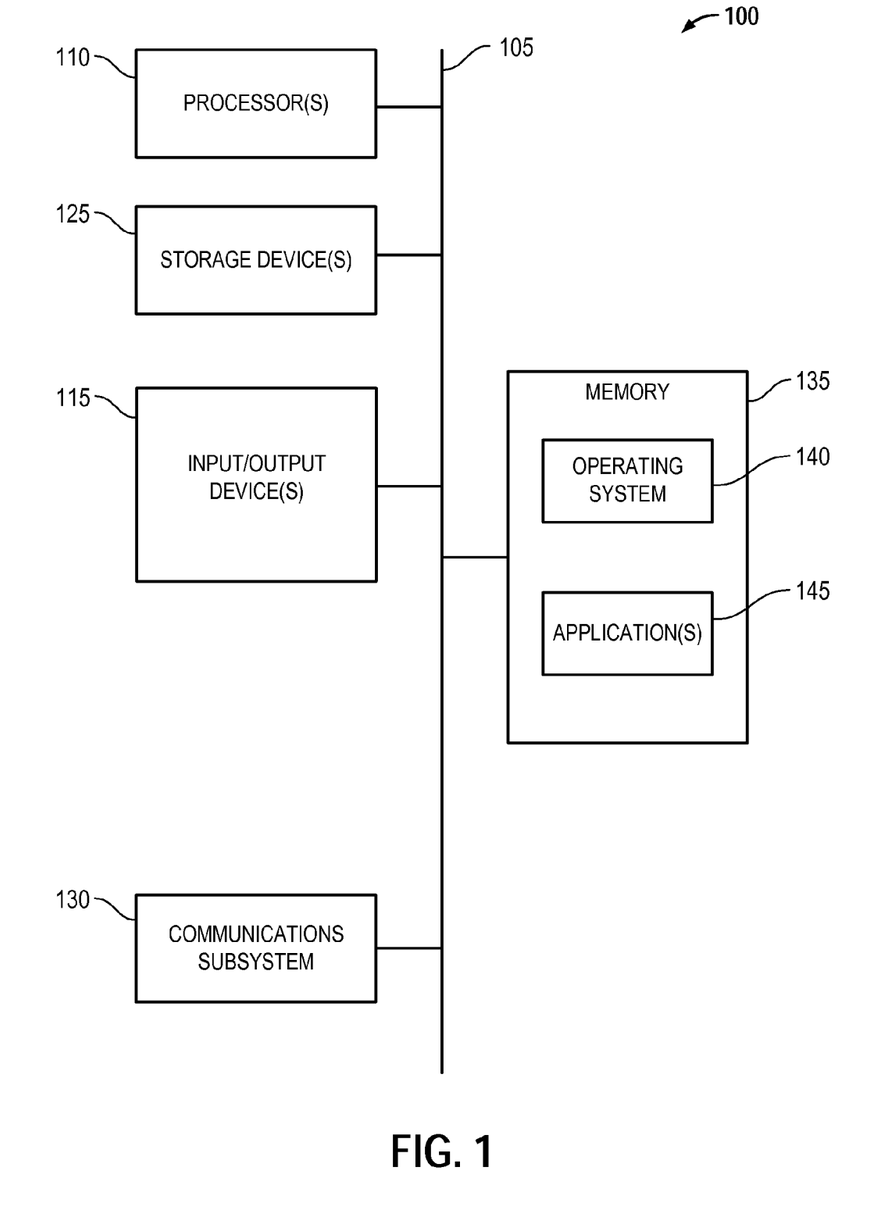
FIG. 1 is diagram illustrating an example device with which embodiments of the disclosure may be practiced.

Referring to FIG. 1, an example device 100 adapted for dynamic register virtualization is shown. The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115, a mouse, a keyboard, a speaker, a printer, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 100 might also include a communication subsystem 130, which can include without limitation a modem, a network card (wireless or wired), an infrared communication device, a wireless communication device and/or chipset (such as a BLUETOOTH device, an 802.11 device, a Wi-Fi device, a WiMAX device, cellular communication facilities, etc.), and/or the like. The communications subsystem 130 may permit data to be exchanged with a network, other computer systems/devices, and/or any other devices described herein. In many embodiments, the device 100 will further comprise a working memory 135, which can include a RAM or ROM device, as described above.

The device 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the device 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

In an ROP attack, the attacker typically exploits a buffer overflow to rigidly chain a number of gadgets that are spread across multiple subroutines. Operations in a subsequent gadget are dependent upon operands values from the previous gadget, which are passed in registers to which gadgets refer by register names. Therefore, an attacker cannot successfully launch an ROP attack if the same register names across different subroutines are mapped to different physical registers and the mapping is inaccessible to the attacker.

Embodiments of the disclosure relate to a method and a processor hardware feature that may randomize register allocation at the register renaming stage in the processor pipeline. Each subroutine call may be executed on its own register mapping, which may be dynamically generated at random by specialized hardware at each time the subroutine is called. For example, a nominal register R[i] referenced in a first subroutine call S[k] may be mapped to a physical register R[i, k], while the same nominal register R[i] referenced in a second subroutine call S[q] may be mapped to a physical register R[i, q], where the physical registers R[i, k] and R[i, q] may be different, even though both subroutine calls reference the same nominal register R[i]. The register mapping may not be accessible by software. Therefore, as the attacker cannot access or predict the register mapping, the ROP program will not behave as expected, and the ROP attack will fail. The mapping of nominal registers to physical registers may be hereinafter referred to as register virtualization.

Herein embodiments of the disclosure may be described in relation to the ARM (Acorn RISC Machine) architecture. However, the disclosure is not limited to any particular architecture. A subroutine may refer to a packaged sequence of program instructions that may be called (e.g., invoked), probably several times and from several places, during the execution of a program, including from other subroutines, and then return to the next instruction after the call once the subroutine's task is done. A subroutine may be alternatively referred to as a procedure, a function, a routine, or a subprogram, and may be an interrupt handler, also known as an interrupt service routine. Multiple nesting of subroutine calls may be possible. For example, a first subroutine call may invoke a second subroutine call, which may in turn invoke a third subroutine call, and so on. At the conclusion of the third subroutine call, the control flow is returned back to the second subroutine call, and at the conclusion of the second subroutine call, the control flow is returned back to the first subroutine call. If one subroutine call invokes another subroutine call, the former may be referred to as the parent subroutine call, and the latter the child subroutine call.

A subroutine call may be indicated by the execution of one or more machine instructions by the processor, such as a BL (branch with link) instruction in the case of the ARM architecture, a JSR (jump to subroutine) instruction in the case of the 68 k architecture, or a CALL instruction in the case of the x86 architecture. Of course, the calling of an interrupt handler may be indicated by an interrupt request. Similarly, a return from a subroutine may also be indicated by the execution of one or more machine instructions by the processor, such as a BX (branch and exchange instruction set) LR instruction in the case of the ARM architecture, an RTS (return from subroutine) instruction in the case of the 68 k architecture, or a RET (return) instruction in the case of the x86 architecture. A return from an interrupt handler maybe indicated by an RTI (return from interrupt) instruction.

Figure 2:
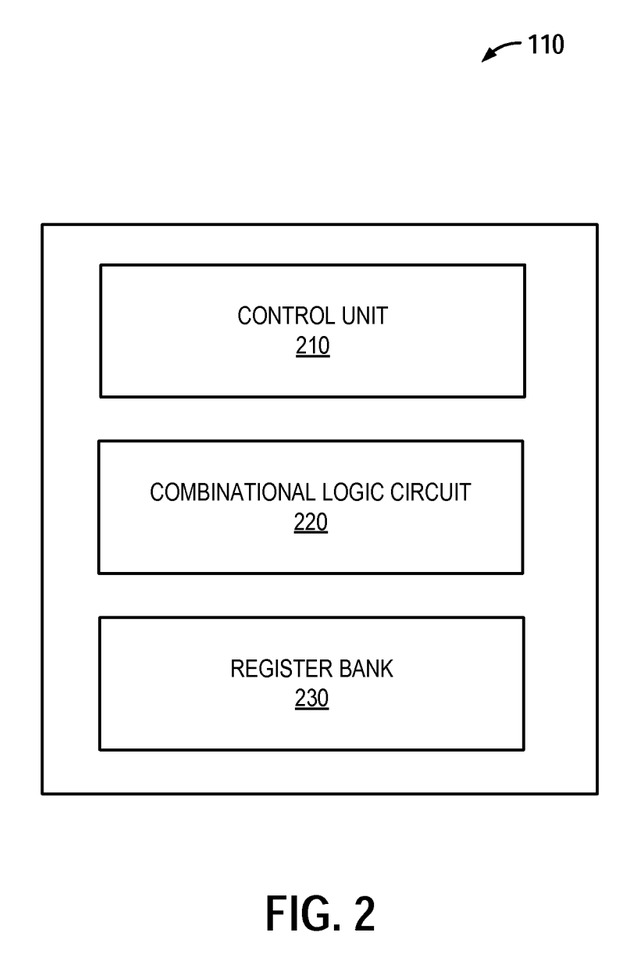
FIG. 2 is a block diagram illustrating various components of an example processor.

Referring to FIG. 2, a block diagram illustrating various components of an example processor 110 is shown. The processor 110 may comprise a control unit 210, a combinational logic circuit 220, and a register bank 230. The control unit 210 directs the operations of the processor and may include an instruction decoding unit that can be used to determine which instruction(s) is to be/being executed. According to embodiments of the invention, the control unit 210 may further include a dynamic register mapping unit. The combinational logic circuit 220 may include circuitry for performing mathematical operations, such as an arithmetic logic unit (ALU). The register bank 230 may comprise a plurality of registers, which are storage devices inside the processor 110 and may include user-accessible registers such as data registers, address registers, general-purpose registers, and/or status registers, etc., and internal registers such as an instruction register, etc. According to embodiments of the disclosure, the register bank 230 may further include a register mapping register that is inaccessible by software or instructions. The processor 110 may further include cache, and/or additional auxiliary units, which are not shown in FIG. 2 in order not to obscure the disclosure.

Figure 3:
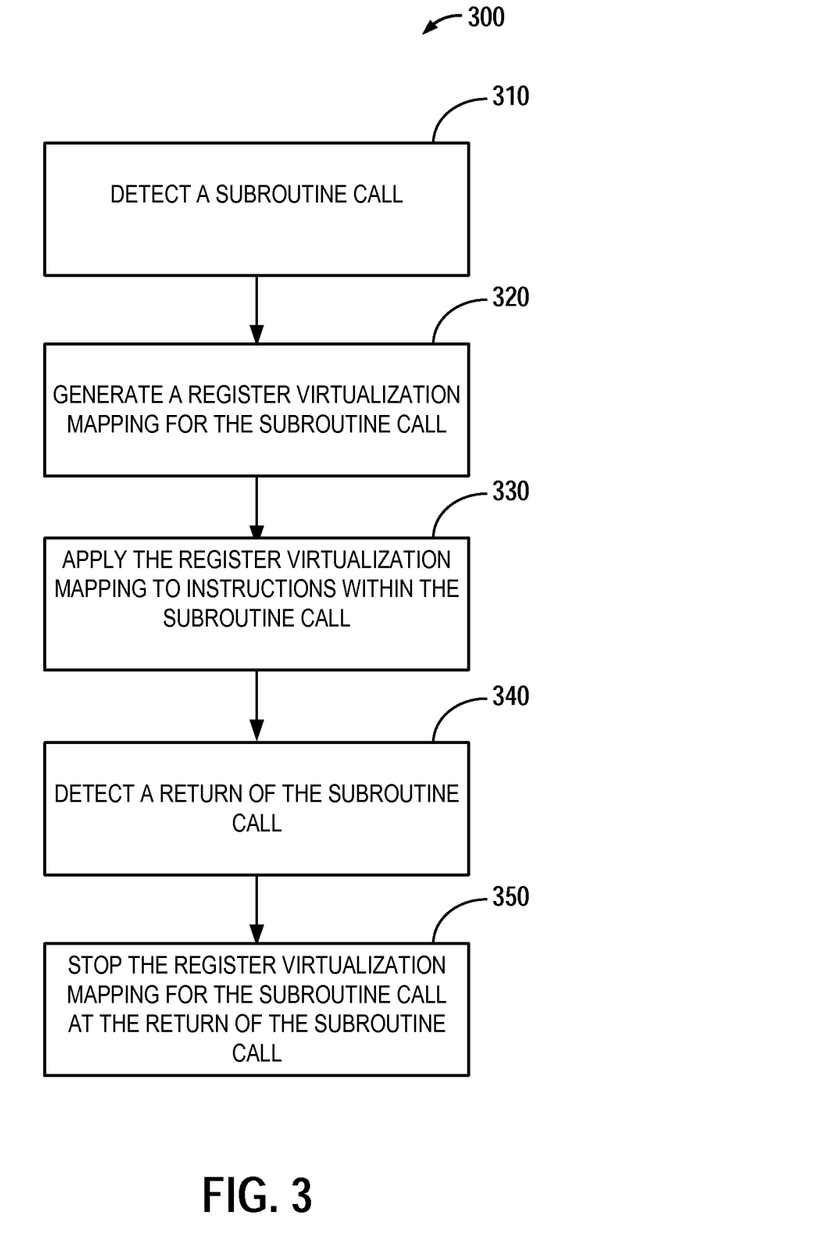
FIG. 3 is a flowchart illustrating an example method for register virtualization.
Figure 4:
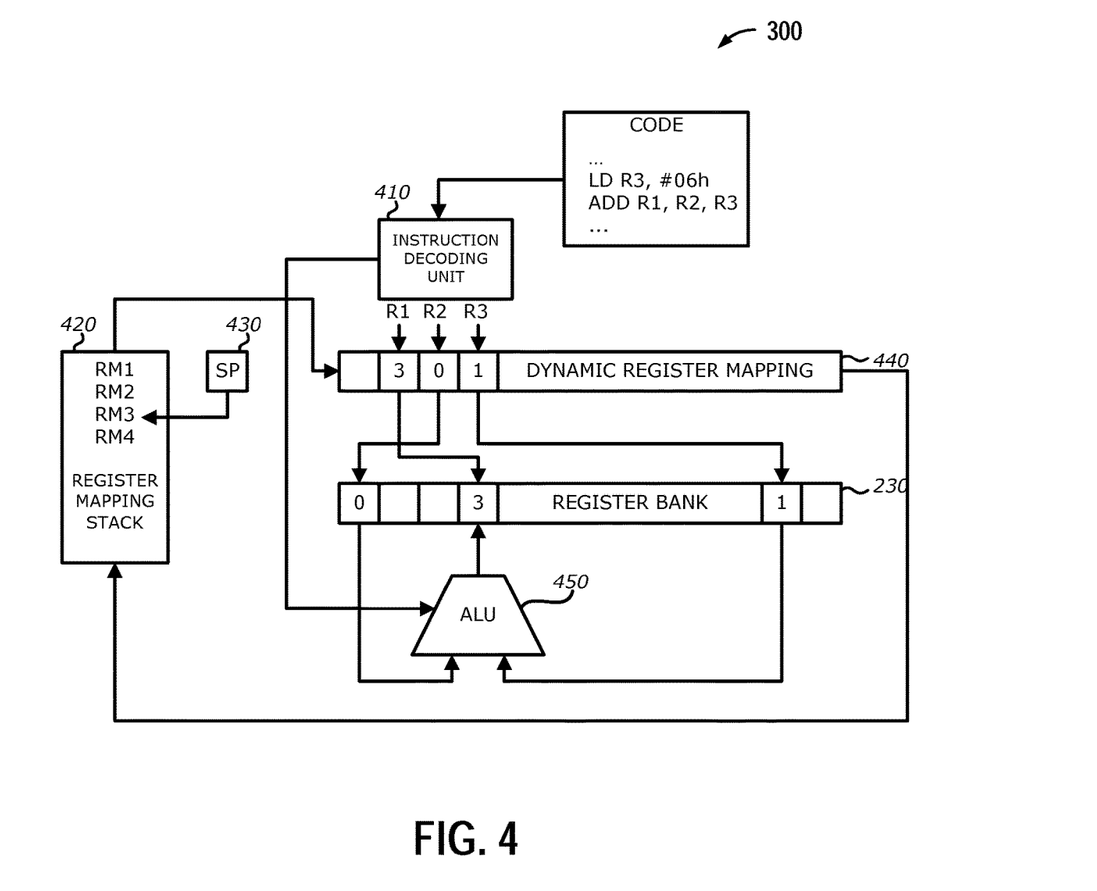
FIG. 4 is a block diagram illustrating an example method for register virtualization.

Referring to FIGS. 3 and 4, a flowchart and a block diagram illustrating an example method 300 for register virtualization are shown, respectively. The method may be implemented within the processor 110 of FIG. 1 under the coordination of the control unit 210 of FIG. 2. At block 310, a subroutine call may be detected. In one embodiment, the detection may be performed using the instruction decoding unit 410 of the control unit 210 of FIG. 2. At block 320, a register virtualization mapping may be generated for the subroutine call. A register virtualization mapping is a bijection between nominal registers and physical registers. The method for generating the register virtualization mapping does not limit the disclosure. Various methods may be used to generate the register virtualization mapping, including the example methods that will be described in detail below.

The register virtualization mapping may be stored in a register mapping stack in either a register mapping register within the processor 110, the main random access memory (RAM) of the non-transitory storage device of FIG. 1, or a dedicated memory outside the processor (not shown). In one embodiment, the processor includes a register mapping register where a register mapping stack 420 including a stack pointer 430 is stored. Therefore, storing the register virtualization mapping in the register mapping register may include pushing the register virtualization mapping to the register mapping stack 420. In another embodiment, the register virtualization mapping may be stored in the main RAM and the address of the RAM location wherein the register virtualization mapping is stored may be pushed to the register mapping stack 420. In a further embodiment, the register mapping stack 420 itself may be stored in the main RAM or in a dedicated memory outside the processor. In different embodiments, the register virtualization mapping for the currently active subroutine call may or may not be stored as the topmost element of the register mapping stack 420. In embodiments where the register virtualization mapping for the currently active subroutine call is stored as the topmost element of the register mapping stack 420, the register virtualization mapping for the parent subroutine call that invoked the currently active subroutine call, if there is one, is stored as the second-to-the-top element of the register mapping stack 420, after the register virtualization mapping for the currently active subroutine call is pushed onto the register mapping stack 420 at the beginning of the currently active subroutine call. At the conclusion of the currently active subroutine call (described below) and the return of the control flow back to the parent subroutine call, the topmost element of the register mapping stack 420 will be removed, and the register virtualization mapping for the parent subroutine call will become the topmost element, thereby recovering and restoring the register virtualization mapping for the parent subroutine call. In embodiments where the register virtualization mapping for the currently active subroutine call is not stored as the topmost element of the register mapping stack 420, the register virtualization mapping for the parent subroutine call that invoked the currently active subroutine call, if there is one, is pushed onto the register mapping stack 420 at the beginning of the currently active subroutine call. At the conclusion of the currently active subroutine call (described below) and the return of the control flow back to the parent subroutine call, the register virtualization mapping for the parent subroutine call will be recovered from the topmost element of the register mapping stack 420 and restored, while the topmost element of the register mapping stack 420 will also be removed. Therefore, in any case, the register virtualization mapping for the parent subroutine call is preserved with the register mapping stack 420 and can be restored at the conclusion of the child subroutine call. It should be further appreciated that more levels of subroutine nesting correspond to more elements in the register mapping stack 420.

At block 330, the register virtualization mapping is applied to all the instructions within the subroutine call by the dynamic register mapping unit 440 of the control unit 210 of FIG. 2. Applying the register virtualization mapping comprises causing operations on the nominal registers according to the instructions within the subroutine call to effect operations on respective physical registers based on the register virtualization mapping. For example, if a nominal register R1 is mapped to a physical register R3, each operation to the nominal register R1 according to the instructions within the subroutine call may effect an operation on the physical register R3 of the register bank 230 of FIG. 2. In the embodiment illustrated in FIG. 4, a nominal register R1 is mapped to a physical register R3, R2 to R0, and R3 to R9. Therefore, an instruction that nominally stores the sum of the contents of registers R2 and R3 into register R1 (e.g., ADD R1, R2, R3) may cause the sum of the contents of the physical registers R0 and R9, as calculated by the ALU 450 of the combinational logic circuit 220 of FIG. 2, to be stored in the physical register R3. At block 340, a return of the subroutine call may be detected. In one embodiment, the detection may be performed using the instruction decoding unit 410. At block 350, the register virtualization mapping for the subroutine call may be stopped at the return of the subroutine call. This may include popping the register mapping stack 420 (e.g., removing the topmost element).

It should be noted that not all registers may be virtualized. For example, with the ARM architecture, registers R0-R3 are used for passing parameters between subroutines, and registers R11-R15 are specifically reserved for SP (stack pointer), PC (program counter), or LR (link register), etc. Therefore, out of the registers R0-R15, only register R4-R10 may be virtualized, and they should be virtualized to enhance security.

Various methods may be used to generate the register virtualization mapping. In one embodiment, a rotation method may be utilized: expressed in a formula, Pi may be equal to (Vi+rand) mod NbReg, where Vi is the index number of a nominal register, rand is a random number dynamically generated for a particular subroutine call in order to implement register virtualization, NbReg is the number of registers, mod denotes the modulo operation, and Pi is the index number of the physical register to which Vi is mapped. Only the value of rand needs to be stored as the register virtualization mapping at the register mapping stack for the subroutine call. Therefore, in an example where there are 6 registers R0-R5 and rand is 2, the register mapping is shown in the table below:

| Vi | Pi |
|---|---|
| R0 | R2 |
| R1 | R3 |
| R2 | R4 |
| R3 | R5 |
| R4 | R0 |
| R5 | R1 |

In another embodiment, a permutation method may be utilized to generate the register virtualization mapping. For each subroutine call, a random lookup table that establishes a bijection between the nominal registers and physical registers may be generated to virtualize the registers. The complete lookup table needs to be stored as the register virtualization mapping at the register mapping stack for the subroutine call.

One aspect of the disclosure is related to an apparatus comprising: a memory; and a processor coupled to the memory, the processor to: detect a subroutine call, generate a register virtualization mapping for the subroutine call, apply the register virtualization mapping to instructions within the subroutine call, detect a return of the subroutine call, and stop the register virtualization mapping for the subroutine call at the return of the subroutine call.

Therefore, by virtualizing the registers, embodiments of the disclosure may significantly reduce ROP attacks as the attacker cannot predict the register mapping across different subroutines. The methods are cost-effective as they involve confined hardware modifications with only a minor impact on the overall processor architecture, and no change to the development environment, including compilation and debugging tools, is required.

Various implementations of a system that virtualizes registers have been previously described in detail. It should be appreciated that application or system that virtualizes registers may be implemented as software, firmware, hardware, combinations thereof, etc. In one embodiment, the previous described functions may be implemented by one or more processors (e.g., processor 110) of a device 100 to achieve the previously desired functions (e.g., the method operations of FIG. 3). Virtualizing the registers enhances security and improves the defense against ROP attacks.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for dynamic register virtualization implemented within a processor, comprising:
   detecting a subroutine call;
   generating a register virtualization mapping that is a bijection between a plurality of nominal registers and a plurality of physical registers for the subroutine call, wherein the register virtualization mapping is inaccessible by software, wherein the processor comprises a plurality of physical registers comprising a first set of reserved registers and a second set of non-reserved registers, wherein the register virtualization mapping is generated for the non-reserved registers, wherein the register virtualization mapping is generated at random for each subroutine call, and wherein the register virtualization mapping comprises a lookup table that maps each of the nominal registers to a respective one of the physical registers;
   applying the register virtualization mapping to instructions within the subroutine call;
   detecting a return of the subroutine call; and
   stopping the register virtualization mapping for the subroutine call at the return of the subroutine call.

2. The method of claim 1, wherein applying the register virtualization mapping comprises causing operations on the nominal registers according to the instructions within the subroutine call to effect operations on respective physical registers based on the register virtualization mapping.

3. The method of claim 1, wherein the register virtualization mapping is stored in a register mapping stack.

4. The method of claim 3, wherein the register mapping stack is stored in a register mapping register within the processor.

5. The method of claim 3, wherein the register mapping stack is stored in a memory outside the processor.

6. The method of claim 1, wherein the register virtualization mapping is generated using a rotation method.

7. The method of claim 1, wherein the register virtualization mapping is generated using a permutation method.

8. An apparatus comprising:
   a memory; and
   a processor coupled to the memory, the processor to:
      detect a subroutine call,
      generate a register virtualization mapping that is a bijection between a plurality of nominal registers and a plurality of physical registers for the subroutine call, wherein the register virtualization mapping is inaccessible by software, wherein the processor comprises a plurality of physical registers comprising a first set of reserved registers and a second set of non-reserved registers, wherein the processor is configured to generate the register virtualization mapping for the non-reserved registers, wherein the processor is configured to generate the register virtualization mapping at random for each subroutine call, and wherein the register virtualization mapping comprises a lookup table that maps each of the nominal registers to a respective one of the physical registers,
      apply the register virtualization mapping to instructions within the subroutine call,
      detect a return of the subroutine call, and
      stop the register virtualization mapping for the subroutine call at the return of the subroutine call.

9. The apparatus of claim 8, wherein applying the register virtualization mapping comprises causing operations on the nominal registers according to the instructions within the subroutine call to effect operations on respective physical registers based on the register virtualization mapping.

10. The apparatus of claim 8, wherein the register virtualization mapping is stored in a register mapping stack.

11. The apparatus of claim 10, wherein the register mapping stack is stored in a register mapping register within the processor.

12. The apparatus of claim 10, wherein the register mapping stack is stored in a memory outside the processor.

13. The apparatus of claim 8, wherein the register virtualization mapping is generated using a rotation method.

14. The apparatus of claim 8, wherein the register virtualization mapping is generated using a permutation method.

15. An apparatus comprising:
   means for detecting a subroutine call;
   means for generating a register virtualization mapping that is a bijection between a plurality of nominal registers and a plurality of physical registers for the subroutine call, wherein the register virtualization mapping is inaccessible by software, wherein the physical registers comprise a first set of reserved registers and a second set of non-reserved registers, and wherein the means for generating the register virtualization mapping comprises means for generating the virtualization mapping for the non-reserved registers, wherein the means for generating are for generating the register virtualization mapping at random for each subroutine call, and wherein the register virtualization mapping comprises a lookup table that maps each of the nominal registers to a respective one of the physical registers;
   means for applying the register virtualization mapping to instructions within the subroutine call;
   means for detecting a return of the subroutine call; and
   means for stopping the register virtualization mapping for the subroutine call at the return of the subroutine call.

16. The apparatus of claim 15, wherein the means for applying the register virtualization mapping comprises means for causing operations on the nominal registers according to the instructions within the subroutine call to effect operations on respective physical registers based on the register virtualization mapping.

17. The apparatus of claim 15, wherein the register virtualization mapping is stored in a register mapping stack.

18. The apparatus of claim 17, wherein the register mapping stack is stored in a register mapping register within the processor.

19. The apparatus of claim 17, wherein the register mapping stack is stored in a memory outside the processor.

20. The apparatus of claim 15, wherein the register virtualization mapping is generated using a rotation method.

21. A non-transitory computer-readable medium including code which, when executed by a processor, causes the processor to perform a method comprising:
   detecting a subroutine call;
   generating a register virtualization mapping that is a bijection between a plurality of nominal registers and a plurality of physical registers for the subroutine call, wherein the register virtualization mapping is inaccessible by software, wherein the processor comprises a plurality of physical registers comprising a first set of reserved registers and a second set of non-reserved registers, wherein the register virtualization mapping is generated for the non-reserved registers, wherein the register virtualization mapping is generated at random for each subroutine call, and wherein the register virtualization mapping comprises a lookup table that maps each of the nominal registers to a respective one of the physical registers;

applying the register virtualization mapping to instructions within the subroutine call;

detecting a return of the subroutine call; and stopping the register virtualization mapping for the subroutine call at the return of the subroutine call.

22. The non-transitory computer-readable medium of claim 21, wherein code for applying the register virtualization mapping comprises code for causing operations on the nominal registers according to the instructions within the subroutine call to effect operations on respective physical registers based on the register virtualization mapping.

23. The non-transitory computer-readable medium of claim 21, wherein the register virtualization mapping is stored in a register mapping stack.

24. The non-transitory computer-readable medium of claim 23, wherein the register mapping stack is stored in a register mapping register within the processor.

25. The non-transitory computer-readable medium of claim 23, wherein the register mapping stack is stored in a memory outside the processor.

26. The non-transitory computer-readable medium of claim 21, wherein the register virtualization mapping is generated using a permutation method.

* * * * *